BEST AVAILABLE COPY
S. W. LUDLOW.
FIRE ALARM APPARATUS.
No. 11,471. Reissued Feb. 12, 1895.
Fig. 1.
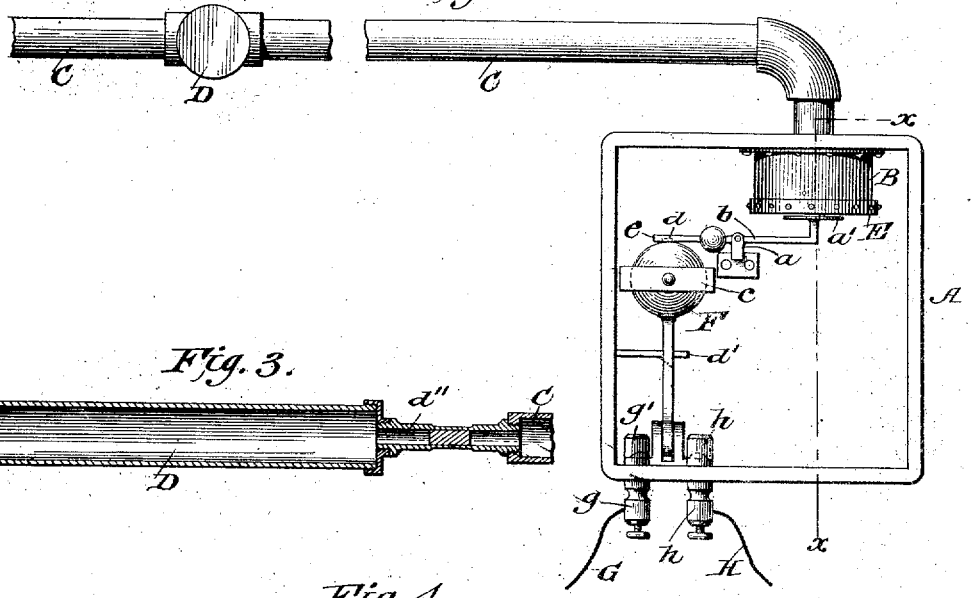
Fig. 3.
Fig. 4.
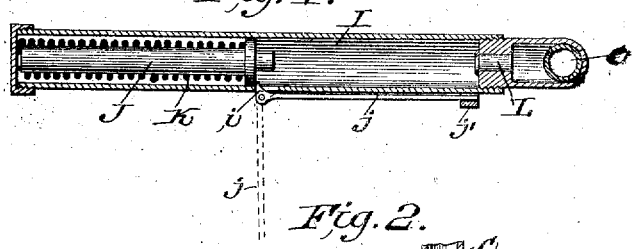
Fig. 2.
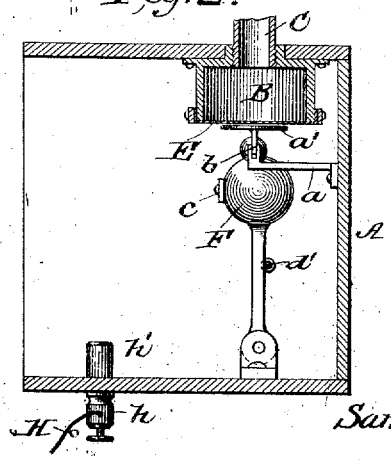
WITNESSES:
W. D. Bloudes.
Walter E. Allen.
INVENTOR
Samuel W. Ludlow
BY Knight Bros.
ATTORNEYS.

BEST AVAILABLE COPY

UNITED STATES PATENT OFFICE.

SAMUEL W. LUDLOW, OF MADISONVILLE, ASSIGNOR, BY MESNE ASSIGNMENTS, TO THE LUDLOW NATIONAL FIRE ALARM COMPANY, OF CINCINNATI, OHIO.

FIRE-ALARM APPARATUS.

SPECIFICATION forming part of Reissued Letters Patent No. 11,471, dated February 12, 1895.

Original No. 502,734, dated August 8, 1893. Application for reissue filed January 19, 1895. Serial No. 535,571.

*To all whom it may concern:*

Be it known that I, SAMUEL WARWICK LUDLOW, a citizen of the United States, residing at Madisonville, county of Hamilton, and State of Ohio, have invented a certain new and useful Improvement in Fire-Alarm Apparatus, of which the following is a clear and exact description, reference being had to the accompanying drawings, forming part of this specification.

My improvement relates to that class of fire-alarm apparatus in which the heat of the burning object causes the mechanism to automatically close a circuit conveying to the fire-alarm or telephone station notice of fire upon the premises upon which my apparatus may be placed.

While my invention is adapted for use in connection with any suitable system of pipes in a building, it is especially intended to be applied to the ordinary illuminating gas-pipe system in a building, thereby saving the expense of additional lines of pipe and producing the new and useful result of using the contents of said pipes for illuminating and fire-alarm purposes at one and the same time, the alarm actuating device at one point being set in operation through the medium of the contents of such pipes, by means of a pressure-inducing device or devices at other points in the building, where a fire takes place.

Figure 1 is a front view of a box containing my device with the lid removed and the various parts of my mechanism in place for operation. Fig. 2 is a section on the line $x$—$x$ of Fig. 1. Fig. 3 is a section of the device for producing concussion. Fig. 4 is a view, corresponding to Fig. 3, showing a modification.

Similar letters of reference indicate identical parts.

Referring to the drawings, A is a suitable box within which is placed various parts of my invention.

B is a drum attached to the inside of the box at the top.

C is a pipe, gas or air pipe screwed into the upper part of said drum, and D is a thermostat attached to the pipe C. The bottom or diaphragm E of the drum B is formed of some air and water-tight material of a flexible nature preferably oiled silk that can readily be expanded by compression or concussion in the pipe C.

Pivoted upon a bracket $a$ attached to the back of the box is a lever $b$ one end of which is bent upward and formed into a disk or button $a'$ normally resting against the diaphragm E.

F is a ball weight hinged to the bottom of the box having secured to it the metallic plate $c$. On the top of the ball is a stud or pin $d$ engaging with the end $e$ of the lever $b$ and preventing the fall of the weight until released by the downward pressure of the diaphragm E upon the disk $a'$. The weight F is slightly out of the perpendicular and is prevented from falling backward by a stop $d'$ attached to the box.

G and H are ground and main wires respectively forming part of a fire alarm system, end $g$ and $h$ are binding posts to which said wires are attached. $g'$ and $h'$ are contact points forming part of the posts $g$ and $h$. When the ball F is released by the diaphragm E, it falls upon and closes the circuit through the contacts $g'$, $h'$.

The thermostat D is a receptacle containing a substance readily expanded by heat such for instance as carbon-bisulphide or other volatile fluid, and has secured to it at one end a smaller pipe or cylinder $d''$ partly filled or plugged with an ordinary fusing metal to prevent the escape of the fluid in the cylinder D until melted by the heat of the fire and is secured to the pipe C. These thermostats are placed at intervals upon the pipes throughout the building, in which my apparatus is placed, in such position as to be readily acted upon by the heat of the fire.

I may also employ for the operation of my apparatus, instead of the thermostat above described, a tube or cylinder I containing a plunger or firing bolt J actuated by a coiled spring K, as shown in Fig. 4. The firing bolt J is held back in position by a lug $i$ upon the hinged edge of a lever $j$ said lever being held up against the pressure of the spring K by wax, fusing metal or the like holding at $j'$ its free end against the cylinder I. The cylinder I when in position for use is secured to a

BEST AVAILABLE COP projection upon the pipe C holding in a suitable vent a cartridge L as shown.

The operation of my device is as follows: When a fire occurs in a building fitted with my apparatus, the heat reaching the thermostat melts the fusing metal in the small pipe *d* and expands or vaporizes the fluid in the cylinder D. This expanded or vaporized fluid on its release by melting of the fusing metal rushes into and adds its volume to the contents of the pipe C compressing the contents or develops pressure therein and causing the bottom or diaphragm E of the drum B to press downward upon the disk *a'*, depressing the disk end of the lever *b* and raises the end *e* of said lever out of engagement with the stud or pin *d* of the weight F releasing said weight which falls with the metallic plate *c* upon the contact points *g'* and *h'* closing the circuit and causing an alarm to be sounded at the fire station at the other end of the wire H. Where the device shown in Fig. 4 is employed a similar result is obtained by the heat of the fire melting the wax or fusing metal *j'* holding the lever *j* which drops, as shown in dotted lines releasing the spring K from engagement with the lug *i* said spring forcing the fire bolt J violently against the cartridge in the projection upon the pipe C, causing it to explode, the concussion producing the result upon the mechanism in the box A as above described.

I have shown two forms of thermostat and others might be designed which employ means set in operation by abnormal heat, to induce pressure in the gas pipe. It is obvious that any form of pressure inducing thermostat may be employed for effecting the desired result, therefore, I do not wish to limit myself to the particular form or arrangement of the apparatus shown.

Having thus described my invention, what I claim, and desire to secure by Letters Patent, is—

1. In a fire-alarm, the combination of the gas pipes containing illuminating gas in the building to be protected, means for giving an alarm exposed to pressure of said gas, pressure-inducing devices connected at various points with the pipes containing said gas, and means for holding said pressure-inducing devices normally inert till heated, whereby the gas becomes the medium for actuating the alarm by transmission of impulses, imparted by the pressure-inducing device, substantially as set forth.

2. In a fire alarm, the combination of air or gas pipes, an alarm actuating device operating by pressure, connected to said pipe, and a thermostat for creating said pressure consisting of an expansible medium normally inactive till application of heat thereto and in communication with the pipe, and when expansion takes place adding its volume to the contents of said pipe to cause the pressure necessary to actuate the alarm as explained.

3. In a fire alarm, the combination of an alarm, adapted to be actuated by pressure, a pipe for communicating pressure to said alarm, and a thermostat for producing pressure in the pipe, and consisting of a receptacle containing a volatile liquid, in communication with the pipe, and a fusible medium normally closing such communication, as explained.

4. In a fire-alarm, the combination of gas or air pipes, thermostats attached to said gas or air pipes, which when actuated by heat causes a compression or concussion in the contents of said pipes, the drum B having a diaphragm E exposed to the pressure in said pipes, the lever *b* having a button *a* resting against said diaphragm, the weight *f* normally retained by said lever, contact points *g'*, *h'* forming terminals in an alarm circuit and upon which the weight is adapted to fall and close the circuit, substantially as explained.

5. A fire-alarm consisting of gas or air pipes, thermostats attached to said gas or air pipes in combination with the drum B having a flexible diaphragm E, the lever *b* actuated by said diaphragm the weight or ball F, having a stud or pin *d* and metallic plate *c*, and the contact for connection with an electric circuit and upon which the weight falls to close said circuit, all substantially as described.

SAMUEL W. LUDLOW.

Witnesses:
H. M. STERLING,
H. S. KNIGHT.